United States Patent
Wu et al.

(10) Patent No.: US 8,514,524 B2
(45) Date of Patent: Aug. 20, 2013

(54) STABILIZED SHIELDS FOR MAGNETIC RECORDING HEADS

(75) Inventors: Yan Wu, Cupertino, CA (US); Glen Garfunkel, San Jose, CA (US); Min Li, Dublin, CA (US); Yuzuru Iwai, Santa Clara, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 993 days.

(21) Appl. No.: 12/151,921

(22) Filed: May 9, 2008

(65) Prior Publication Data

US 2009/0279213 A1  Nov. 12, 2009

(51) Int. Cl.
*G11B 5/33* (2006.01)
*G11B 5/127* (2006.01)

(52) U.S. Cl.
USPC ........................................................ 360/319

(58) Field of Classification Search
USPC .............................................. 360/319, 281.6
See application file for complete search history.

(56) References Cited

U.S. PATENT DOCUMENTS

| | | | |
|---|---|---|---|
| 5,465,185 A | | 11/1995 | Heim et al. |
| 5,701,223 A | | 12/1997 | Fontana, Jr. et al. |
| 6,358,635 B1 * | 3/2002 | Min et al. | 428/800 |
| 6,437,949 B1 * | 8/2002 | Macken et al. | 360/319 |
| 6,456,467 B1 * | 9/2002 | Mao et al. | 360/319 |
| 6,496,335 B2 * | 12/2002 | Gill | 360/319 |
| 6,517,896 B1 * | 2/2003 | Horng et al. | 427/123 |
| 6,801,409 B2 * | 10/2004 | Michel et al. | 360/319 |
| 7,180,712 B1 | 2/2007 | Li et al. | |
| 7,236,333 B2 | 6/2007 | Macken | |
| 2003/0137785 A1 * | 7/2003 | Saito | 360/324.11 |
| 2005/0201022 A1 * | 9/2005 | Horng et al. | 360/324.11 |
| 2007/0014054 A1 * | 1/2007 | Zhang et al. | 360/324.12 |
| 2007/0139826 A1 | 6/2007 | Carey et al. | |
| 2007/0188944 A1 * | 8/2007 | Hoshino et al. | 360/324.12 |
| 2007/0195467 A1 * | 8/2007 | Gill | 360/319 |
| 2007/0201167 A1 * | 8/2007 | Lin | 360/319 |
| 2007/0242391 A1 * | 10/2007 | Yamaguchi et al. | 360/319 |
| 2008/0180860 A1 * | 7/2008 | Takahashi et al. | 360/314 |
| 2008/0239591 A1 * | 10/2008 | Fuji et al. | 360/324.12 |
| 2010/0067148 A1 * | 3/2010 | Tsuchiya et al. | 360/245.3 |

OTHER PUBLICATIONS

Co-pending, U.S. Appl. No. 11/888,856, filed Aug. 2, 2007, "Improved Shield Design for Magnetic Recording Head," assigned to the same assignee as the present invention.

* cited by examiner

*Primary Examiner* — Wayne Young
*Assistant Examiner* — Adam B Dravininkas
(74) *Attorney, Agent, or Firm* — Saile Ackerman LLC; Stephen B. Ackerman

(57) ABSTRACT

A basic design is disclosed for bottom shield (S1) and top shield (S2) of the reader shields in a magnetic read-write head. The critical part of new design includes an antiferromagnetic film which pins an antiferromagnetically coupled trilayer (AFCT). The simplest embodiment for top shield, for example, would be a film sequence of FM/Ru/FM/AFM. This replaces the normal top shield design which typically comprises a ferromagnetic seed layer and a thicker plated ferromagnetic film. Processes for manufacturing these shields are also described.

23 Claims, 3 Drawing Sheets

STABILIZED SHIELDS FOR MAGNETIC RECORDING HEADS

This application is related to HT06-041, filed on Aug. 2, 2007 as application Ser. No. 11/888,856, and herein incorporated, by reference, in its entirety.

FIELD OF THE INVENTION

The invention relates to the general field of magnetic read-write heads with particular reference to stabilizing their associated internal shields.

BACKGROUND OF THE INVENTION

Magnetic read-write heads typically include two magnetic shields that are important for the reader part—the shield S1 below the read sensor, also called the bottom shield, and shield S2 immediately above the sensor, also called the top shield. Current typical thick film shield designs have several problems, including magnetic stability problems, increased spacing between reader and writer, and manufacturing and other issues. Changes in shield magnetic domain states can cause sensor signal changes; these are the so-called shield magnetic stability problems which may arise from applied external fields, media fields, internal write head related or thermal stresses, or even from statistical equilibrium state changes. A new shield design is disclosed that overcomes these problems.

These, and other limitations of the prior art can be seen in the references that we review immediately below:

U.S. Pat. No. 7,180,712 by Min Li et al. describes a laminated shield using Ru, but no AFM; it applies to MR heads, not TMR/CPP. Without the AFM layers, the shield may rotate or switch as a whole, as there is no single preferred orientation. The present invention applies to TMR/CPP and GMR/CPP devices. Min's patent also has undercoat limitations, which are not relevant for the present invention.

U.S. Pat. No. 6,801,409 by Richard Michel et al. also applies to MR heads. It describes a non-laminated shield that employs an AFM to pin the shield. It is thus a single ferromagnetic(FM) layer, which is different from the present invention. In Michel's patent, the shield domain pattern is, ideally, stabilized and locked in by setting the AFM during an anneal; but as the shield is a monolayer it will have a large net moment, and is thus much harder to stabilize. There is no discussion of film thicknesses.

U.S. Pat. No. 7,236,333 by Macken and Daclen applies to MR heads also. They employ an AFM pinned bilayer, but with ferromagnetic bilayer decoupled through a non-magnetic thick spacer layer. U.S. Patent Application 2007/0195467 (Gill) shows a second shield layer comprising a FM layer, an AFM layer, and a non-magnetic layer.

U.S. Patent Application 2007/0139826 (Carey et al) discloses a shield with anisotropy achieved by use of textured surfaces. U.S. Pat. No. 6,496,335 (Gill) shows FM layers separated by spacer layers such as Ru as a shield, but does not include AFM layers as part of the system. Also, it claims a net moment for the FM layers, and applies to GMR/CPP heads. In U.S. Pat. No. 6,456,467, Mao et al. disclose "Laminated shields with antiparallel magnetizations". This work does not include an AFM pinning layer.

SUMMARY OF THE INVENTION

The shield design disclosed here can be applied to either or both S1 and S2. The new design includes use of thin ferromagnetic films (FM) which are antiferromagnetically coupled (AFC) through Ru, and antiferromagnetically pinned through use of IrMn or similar layers (AFM). As an example, one of the preferred embodiments, for the case of the top shield, is a FM/Ru/FM/AFM multilayer system, where the FM are ferromagnetic layers (and may include sublayers), and Ru provides the antiferromagnetic coupling between the FM layers, and the AFM layer IrMn (or other antiferromagnetic layers) pins the rest of the system (FM/Ru/FM) and results in a preferred single orientation and direction for the shield magnetic domains.

The use of 2 (or more) antiparallel FM layers allows large reductions (or elimination) of the shield net moment, and consequently allows much better pinning than can be achieved with only a single FM layer. If more the two FM layers are included, the system design is denoted as FM/Ru/FM(.../Ru/FM)/AFM, which altogether is referred to as the 'SAF/AFM' system. The FM/Ru/FM(.../Ru/FM) part is the synthetic antiferromagnet, or SAF. All layers are required in order to achieve stable robust magnetic domain control, with a single preferred magnetic orientation; neighboring FM layers will have opposing or antiparallel domain orientations, by virtue of the AFC coupling.

Without the AFM layer, the system has multiple stable magnetic domain states. Without the Ru, for example by substituting some other non-AFC spacer, certain of the FM layers would not be stable. With only a single FM layer, the system net moment is high, shield edge demagnetizing field value and range will be very high, and the shield domain state will be difficult to stabilize. The multilayers of the SAF/AFM structure act together as a complete system which is the key part of the new stable shield design disclosed here; the SAF/AFM together with optional supplementary shielding, is called the 'compound shield.' This design allows reduction or optimization of read-gap-to-write-gap spacing, simplifies manufacturing, and eliminates some secondary constraints (on junction design) or penalties that burden the current unstable designs.

It has been an object of at least one embodiment of the present invention to provide an improved shield for a magnetic read-write head.

Another object of at least one embodiment of the present invention has been to provide a process for manufacturing said shield.

Still another object of at least one embodiment of the present invention has been that the SAF/AFM part of the compound shield have a thickness less than 2500 Angstroms, without suffering any performance degradation. For the case of top shield S2, this thinner shield allows reduction of certain write-to-read spacing and other critical head parameters.

A further object of at least one embodiment of the present invention has been to assure a reproducible shield magnetic domain orientation, a directional anisotropy, and a controlled response or rotation of the shield domains in an applied external field.

These objects have been achieved by the use of a compound multilayer shield which may be used for either bottom (S1) or top (S2) shields of a TMR/CPP or GMR/CPP magnetic recording head. The same design applies even for heads that contain only a single shield, e.g. only a bottom shield, or only a top shield The basic design that we disclose for top shields is FM/Ru/FM/(optional additional Ru/FM)/AFM(with cap), and optional additional non-magnetic spacer and ferromagnetic shielding on top of AFM. The basic design for bottom shields is the inverse of the top shield, which is altogether [(Optional [Shielding)/(Non-magnetic Spacer)]/AFM/FM/Ru/FM. For top shield compound shields, the optional shielding on top of SAF/AFM is called the S2b shield. The arrows in FIG. 1 indicate a possible magnetization orientation for the FM layers near the sensor.

DESCRIPTION OF THE PREFERRED EMBODIMENTS

In the description of the invention that follows we will provide details in terms of the top shield (S2) system but it is to be understood that all these features may be applied with comparable effect to improve the bottom shield (S1) system. For the top shield, the preferred embodiments are FM/Ru/FM/AFM or FM/Ru/FM/Ru/FM/AFM (3 FM layer version).

A thermal anneal at between approx. 150 and 280° C. is preformed at some step after deposition, to set the pinning layer orientation, and establish the intended domain orientation for the FM layers; the anneal can be performed with or without an externally applied field, depending on design optimization considerations.

The use of 3 FM layers, as opposed to 2 FM layers, results in opposite magnetic domain orientation for the FM layer closest to the sensor (for field anneal in a fixed direction). Because either orientation may be desirable depending on other aspects of the design, both 2 and 3 FM layer designs are among the preferred embodiments.

As a certain amount of unbalance in the FM layers may be desirable, e.g. having the FM layer adjacent the sensor have a slightly higher moment than the other FM layer (for dual FM design), to assure specific rotation with applied external field.

A multilayer stabilized shield is disclosed. An important feature is that it eliminates the shield state changes that result in sensor magnetic performance changes in TMR/CPP and GMR/CPP magnetic recording heads. Stabilizing the shield in particular will further enable reduction of thermal protrusion by thinning of the shield, enable relaxation of junction design constraints (currently hypersensitive to topology), and enable further the read gap. A specific example of new S2 design (SAF/AFM) would be NiFe(500 Å)/CoFe(~20 Å)/Ru(7 Å)/CoFe(~20 Å)/NiFe(500 Å)/IrMn(70 Å), made using an all dry process. A schematic of this is given in FIG. 1 Other specific examples are NiFe(500 Å)/CoFe(~20 Å)/Ru(7 Å)/CoFe(~20 Å)/NiFe 500 Å)/CoFe (~20 Å)/IrMn(70 Å) or NiFe(500 Å)/Ru(7 Å)/NiFe(500 Å)/CoFe(~20 Å)/IrMn(70 Å) which differ in pinning and coupling due to the CoFe sublayers in FM layers.

Other permutations are recited in the claims below.

There are several improvements in head design that the disclosed shields achieve:

a. Stabilizes shield to minimize amp/asym/noise problems arising from shield magnetic state changes b. Facilitates use of much thinner shields than are currently employed, thus improving protrusion issues c. Makes possible the reduction or elimination of S2b, in which case S2 is an all dry process.

d. Enables thinner read gaps.

e. With a stable S2, constraints on topology are relaxed making feasible thicker Hard Bias and other junction designs.

f. With a thinner S2, a reduction of read-gap to write-gap separation becomes possible g. With a stable shields, constraints on the shield shapes are relaxed.

Figure 1:
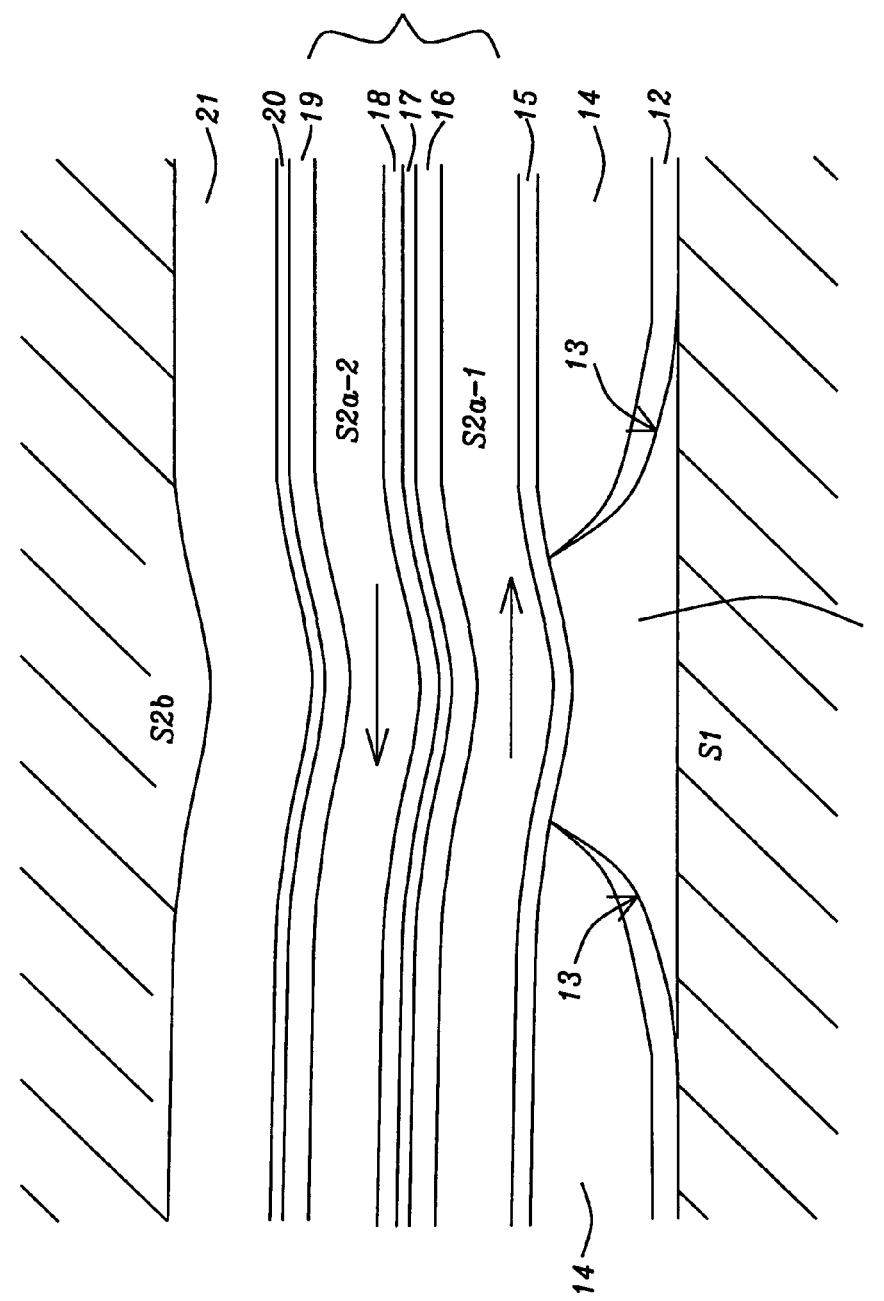
FIG. 1. illustrates the structural features of a dual FM layer embodiment of the invention as applied to a top shield. The arrows indicate possible magnetization orientations of the upper and lower FM layers.

Referring now to FIG. 1, we describe below a process for the manufacture of the present invention. This process description will also serve to describe the structure of the invention.

After forming TMR/CPP or GMR/CPP stack 11, on bottom shield S1, in the usual way, isolation layer 12 is deposited onto sidewalls 13 as well as onto the upper surface of S1, while leaving stack 11's top surface uncovered. Longitudinal bias/cap layer 14 is then deposited onto isolation layer 12, following which conducting spacer layer 15 is deposited onto longitudinal bias layer 14 as well as onto the top surface of stack 11. These steps are not part of the invention but rather the sensor that the invented shield provides shielding for. No constraints are made for spacer layer 15 thickness, meaning the disclosure covers the range of thickness down to 0 Angstroms.

Next, on top of conducting spacer layer 15, is deposition of the first FM layer, which comprises ferromagnetic layer S2a-1 and optional ferromagnetic sublayer layer 16. On top of this is deposited the Ru antiferromagnetic coupling (AFC) layer 17, and a second FM layer; similarly, this second FM layer comprises optional ferromagnetic sublayer layer 18 followed by S2a-2. The sublayers enhance the antiparallel exchange strength mediated by the Ru, while S2a-1 and S2a-2 provide the majority of the shielding. For this drawing, S2a-1 & 16 & 17 & 18 & S2a-2 comprise the SAF (synthetic antiferromagnet). The FM sublayers each comprise one or more materials selected from the group consisting of NiFe, FeSiAl, FeN, CoFe, CoNiFe, CoFeB, and CoZrNb.

Typically the thicknesses of these ferromagnetic layers are between 70 and 2000 Angstroms. In a given SAF, the FM layers may have approximately the same thickness, for a zero net moment design, or as a matter of design choice, may have a thickness difference of up to about 30%, thereby causing the SAF to have an intentional unbalanced magnetic moment, whereby specific domain rotation in an applied external field is assured.

Figure 2:
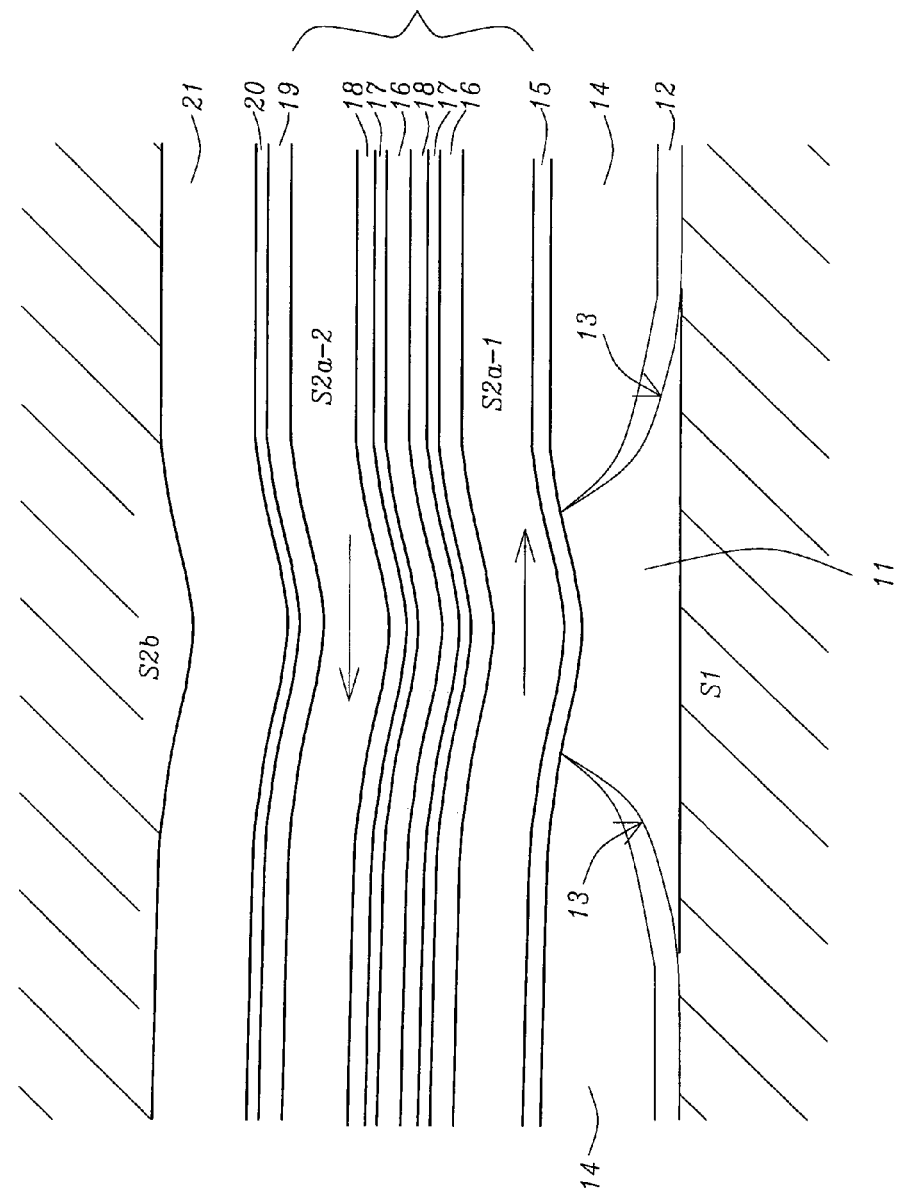
FIG. 2 illustrates the inclusion of additional AFCT and FM sub-shield layers in S2a2.

As a matter of designer's choice, one or more additional Ru/FM layers may now be formed on S2a2. This is illustrated in FIG. 2.

The process continues with the deposition of pinning AFM layer 19. The latter is made up of one or more layers selected from the group consisting of NiMn, FeMn, PtMn, IrMn, PtPdMn, and NiO. Note that the FM layer adjacent the AFM layer may be made along with a special sublayer, to improve the exchange coupling between this FM and the AFM layers. A second capping layer 20 can now be deposited onto pinning AFM layer 19 to stabilize the AFM layer. As a final option and additional design choice prior to the conclusion of the process of the invention, supplementary shield layers such as S2b may be formed on spacer layer 21; these may be needed for additional spacing and shielding.

An important advantage of the structure of the present invention is that the various layers that comprise it may be kept to a minimum thickness; The SAF/AFM structure combined thickness can be less than 0.25 microns, and as thin as approx. 200 Angstroms.

To complete manufacture of the full read-write head, the writer substructure (which is not shown here) will now be formed using spacer layer 21 as its substrate, or supplementary shield S2b may serve this purpose as a matter of design choice. Whether or not one opts to include S2b may depend on the stability of the SAF/AFM structure, and the amount of isolation, including thermal isolation, that is needed between the writer and the reader.

The films of the current invention can be patterned into any shield shape (shape from plan view), including those of invention HT06-041 (incorporated herein by reference earlier). The shapes of invention HT06-041 can further optimize their behavior in the presence of repeated initialization fields, and include trapezoids, modified trapezoids, assisted trapezoids, hexagons, irregular octagons, notched quadrilaterals, and trapezoids modified to have reduced contact with the ABS (air bearing surface).

Using any of these shapes will not reduce the advantages that are incurred when the process and structure disclosed in the present invention are employed. Nor will there be any loss in the effectiveness of the present invention if the various shields within a given head have shapes that differ one from another.

Figure 3:
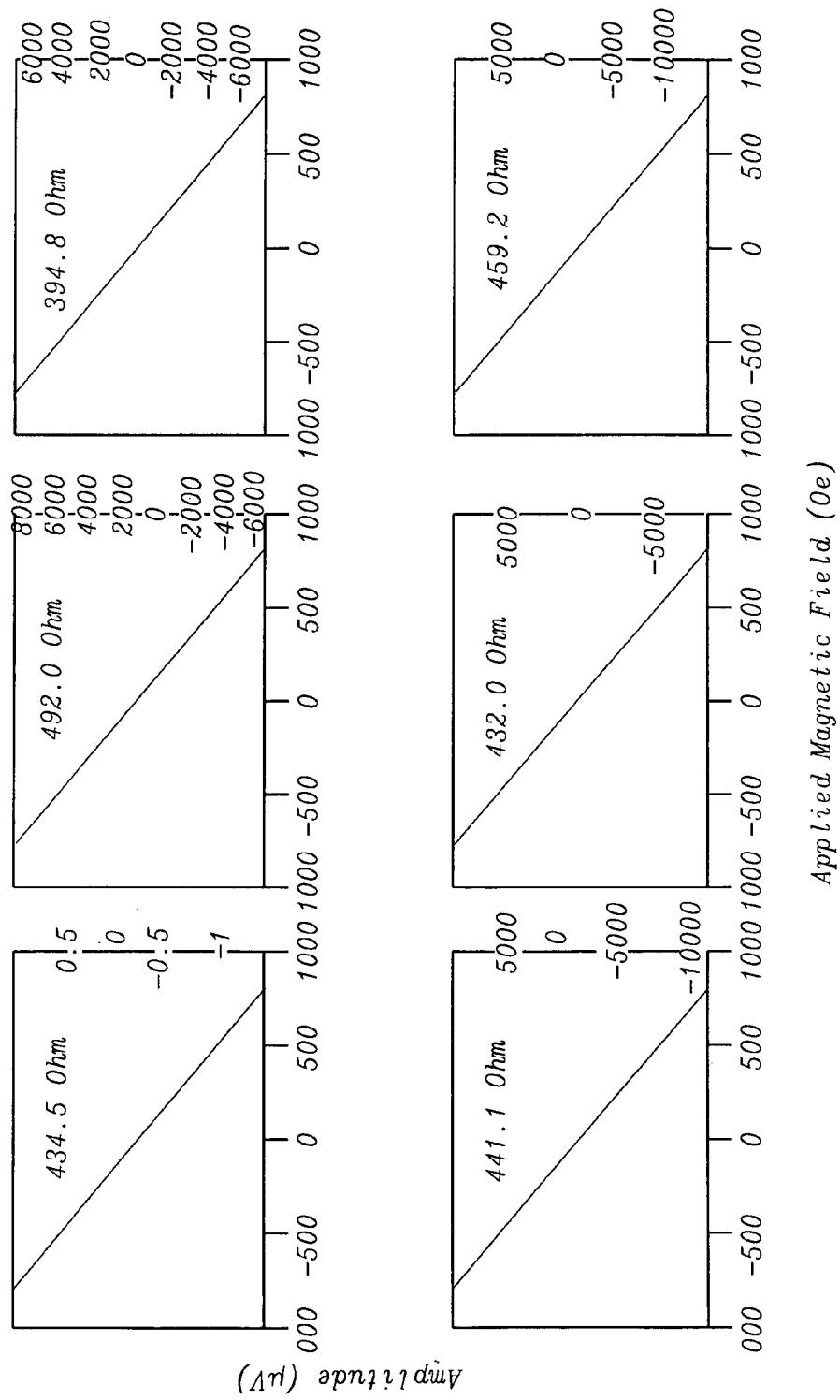
FIG. 3 shows quasi-static transfer curves for samples with SAF/AFM pinned S2A.

Referring now to FIG. 3, we show there a series of quasi-static transfer curves for samples with SAF/AFM pinned S2A, as a way of demonstrating their good performance. These samples all had thick (plated) S1 and S2b layers while their S2a design was of the form FM/Ru/FM/AFM.

What is claimed is:

1. A process to manufacture a MR device in a stable compound shield system, having compound top and bottom shields, for use with a magnetic read-write head, comprising:
    providing a first spacer layer and depositing thereon a first ferromagnetic (FM) sub-shield layer;
    depositing on said first FM sub-shield layer a first antiferromagnetically coupled trilayer (AFCT) comprising a Ru layer sandwiched between two FM layers;
    depositing over said antiferromagnetically coupled trilayer a second FM sub-shield layer;
    depositing a first capping layer, thereby completing formation of said compound bottom shield and reducing said compound bottom shield's magnetic moment to zero;
    depositing said MR device;
    depositing an antiferromagnetic (AFM) layer over said compound top shield, thereby allowing the presence of only a single magnetic domain state in said compound top shield; and
    depositing a second capping layer on said AFM layer, thereby completing formation of said compound top shield and assuring a reproducible shield magnetic domain orientation, a directional anisotropy, and controlled rotation of all shield domains in an applied external field.

2. The process recited in claim 1 wherein each of said FM layers comprises at least one layer selected from the group consisting of NiFe, FeSiAl, FeN, CoFe, CoNiFe, CoFeB, and CoZrNb.

3. The process recited in claim 1 wherein said AFM layer comprises at least one layer selected from the group consisting of NiMn, FeMn, PtMn, IrMn, PtPdMn, and NiO.

4. The process recited in claim 1 wherein said Ru layer is between 2 and 20 Angstroms thick.

5. The process recited in claim 1 wherein a combination of an FM and an AFM layer has a total thickness that is less than 0.25 µm.

6. The process recited in claim 1 wherein each FM sub-shield is deposited to a thickness in the range of from 50 to 2000 Angstroms.

7. The process recited in claim 1 wherein the FM layers that comprise the AFCT have thicknesses that differ from one another by up to about 30%, thereby causing said compound shield system to have an unbalanced magnetic moment, whereby specific rotation in an applied external field is assured.

8. The process recited in claim 1 further comprising annealing at a temperature between 150 and 280°C. in an external magnetic field, in order to set AFM orientation.

9. The process recited in claim 1 wherein said MR device is a CPP device selected from the group consisting of GMR and MTJ devices.

10. The process recited in claim 1 further comprising depositing additional AFCT and FM sub-shield layers on said second FM sub-shield layer prior to depositing said first capping layer.

11. A process to manufacture a MR device having a compound bottom shield, for use as a magnetic read-write head, comprising:
    providing a substrate and depositing thereon a first antiferromagnetic (AFM) layer;
    depositing on said first AFM layer a first ferromagnetic (FM) sub-shield layer;
    depositing on said first FM sub-shield layer an antiferromagnetically coupled trilayer (AFCT) comprising a Ru layer sandwiched between two FM layers;
    depositing on said first AFCT a second FM sub-shield layer, thereby reducing said compound bottom shield's magnetic moment to zero;
    depositing a capping layer, thereby completing formation of said compound bottom shield; and
    on said capping layer, depositing a stack, longitudinal bias layers, and a top shield, thereby completing formation of said MR device and assuring a reproducible shield magnetic domain orientation, a directional anisotropy, and controlled rotation of all shield domains in an applied external field.

12. A process to manufacture a MR device having a compound top shield, for use as a magnetic read-write head, comprising:
    providing a bottom shield and depositing thereon a stack and longitudinal bias layers that also serve as a first capping layer, thereby completing formation of said MR device;
    depositing on said first capping layer a first ferromagnetic (FM) sub-shield layer;
    depositing on said first FM sub-shield layer an antiferromagnetically coupled trilayer (AFCT) comprising a Ru layer sandwiched between two FM layers;
    depositing on said AFCT a second FM sub-shield layer;
    depositing additional AFCT and FM sub-shield layers on said second FM sub-shield layer, thereby reducing said compound top shield's magnetic moment to zero;
    depositing an antiferromagnetic (AFM) layer , thereby allowing the presence of only one magnetic domain state; and
    depositing a second capping layer on said AFM layer, thereby completing formation of said compound top shield and assuring a reproducible shield magnetic domain orientation, a directional anisotropy, and controlled rotation of all shield domains in an applied external field.

13. A compound shield system having compound top and bottom shields , for use with a magnetic read-write head, comprising:
    a first ferromagnetic (FM) sub-shield layer-on a first spacer layer;
    on said first FM sub-shield layer a first antiferromagnetically coupled trilayer (AFCT) comprising a Ru layer sandwiched between two FM layers;

on said first AFCT a second FM sub-shield layer;
a first capping layer on said second FM sub-shield layer, thereby defining said compound bottom shield which has a magnetic moment of zero;
an antiferromagnetic (AFM) layer on said compound bottom shield whereby there is only one magnetic domain state for said FM layers;
a second capping layer on said AFM layer; and
a reproducible shield magnetic domain orientation, a directional anisotropy, and controlled rotation of all shield domains in an applied external field.

14. The compound shield system described in claim 13 wherein each of said FM layers comprises at least one layer selected from the group consisting of NiFe, FeSiAl, FeN, CoFe, CoNiFe, CoFeB, and CoZrNb.

15. The compound shield system described in claim 13 wherein said AFM layer comprises at least one layer selected from the group consisting of NiMn, FeMn, PtMn, IrMn, PtPdMn, and NiO.

16. The compound shield system described in claim 13 wherein said Ru layer is between 2 and 20 Angstroms thick.

17. The compound shield system described in claim 13 wherein a combination of an FM and an AFM layer has a total thickness that is less than 0.25 μm.

18. The compound shield system described in claim 13 wherein each FM sub-shield has a thickness in the range of from 50 to 2000 Angstroms.

19. The compound shield system described in claim 13 wherein the FM layers that comprise the AFCT have thicknesses that differ from one another by up to about 30%, thereby causing said compound shield system to have an unbalanced magnetic moment, whereby specific rotation in an applied external field is assured.

20. The compound shield system described in claim 13 wherein said MR device is a CPP device selected from the group consisting of GMR and MTJ devices.

21. The compound shield system described in claim 13 further comprising additional AFCT and FM sub-shield layers between said second FM sub-shield layer and said first capping layer.

22. A magnetic read head, including a MR device, having a compound bottom shield, comprising:
a first antiferromagnetic (AFM) layer on a substrate;
on said first AFM layer a first ferromagnetic (FM) sub-shield layer;
on said first FM sub-shield layer an antiferromagnetically coupled trilayer (AFCT) comprising a Ru layer sandwiched between two FM layers;
on said AFCT a second FM sub-shield layer;
additional AFCT and FM sub-shield layers on said second FM sub-shield layer and, thereon, a first capping layer that defines an upper boundary for said compound bottom shield which has both zero magnetic moment as well as only one stable magnetic domain state;
on said first capping layer, a stack longitudinal bias layers, and a second capping layer;
a top shield on said second capping layer; and
a reproducible shield magnetic domain orientation, a directional anisotropy, and controlled rotation of all shield domains in an applied external field.

23. A magnetic read head, including a MR device, having a compound top shield, comprising:
on a bottom shield, said MR device comprising a stack and longitudinal bias layers, that also serve as a first capping layer;
on said first capping layer a first ferromagnetic (FM) sub-shield layer;
on said first FM sub-shield layer an antiferromagnetically coupled trilayer (AFCT) comprising a Ru layer sandwiched between two FM layers;
on said AFCT, a second FM sub-shield layer;
additional AFCT and FM sub-shield layers on said second FM sub-shield layer;
said FM sub-shields layers having a net magnetic moment of zero;
an antiferromagnetic (AFM) layer on a topmost FM sub-shield whereby said compound top shield has only one magnetic domain state;
a second capping layer on said AFM layer that defines an upper boundary for said top shield; and
a reproducible shield magnetic domain orientation, a directional anisotropy, and controlled rotation of all shield domains in an applied external field.

* * * * *